(12) United States Patent
Otsuji et al.

(10) Patent No.: US 11,848,556 B2
(45) Date of Patent: Dec. 19, 2023

(54) POWER AND COMMUNICATIONS NETWORK CONVERGENCE SYSTEM, AND CONTROL METHOD THEREIN

(71) Applicant: TOHOKU UNIVERSITY, Miyagi (JP)

(72) Inventors: Taiichi Otsuji, Miyagi (JP); Katsumi Iwatsuki, Miyagi (JP)

(73) Assignee: SUMITOMO MITSUI BANKING CORPORATION, Tokyo (JP)

( * ) Notice: Subject to any disclaimer, the term of this patent is extended or adjusted under 35 U.S.C. 154(b) by 0 days.

(21) Appl. No.: 17/264,615

(22) PCT Filed: Mar. 17, 2020

(86) PCT No.: PCT/JP2020/011764
§ 371 (c)(1),
(2) Date: Jan. 29, 2021

(87) PCT Pub. No.: WO2021/186565
PCT Pub. Date: Sep. 23, 2021

(65) Prior Publication Data
US 2023/0027074 A1     Jan. 26, 2023

(51) Int. Cl.
*H02J 1/14*     (2006.01)
*H02J 1/10*     (2006.01)
*H02J 13/00*    (2006.01)

(52) U.S. Cl.
CPC .............. *H02J 1/14* (2013.01); *H02J 1/106* (2020.01); *H02J 13/00016* (2020.01)

(58) Field of Classification Search
CPC ......... H02J 13/00016; H02J 1/106; H02J 1/14
See application file for complete search history.

(56) References Cited

U.S. PATENT DOCUMENTS

| 2013/0051216 A1 | 2/2013 | Bisdikian et al. |
| 2017/0201093 A1 | 7/2017 | Morita |
| 2020/0091855 A1* | 3/2020 | Pevear ............... H02S 10/10 |

FOREIGN PATENT DOCUMENTS

| CN | 101944750 | 1/2011 |
| EP | 2852173 | 3/2015 |

(Continued)

OTHER PUBLICATIONS

Chinese Office Action dated Jun. 10, 2021 corresponding to National Phase U.S. Appl. No. 17/264,615 "Power and Communications Network Convergence System, and Control Method Therein" first named inventor Otsuji, Taiichi 4 pages.

(Continued)

*Primary Examiner* — Daniel Cavallari
(74) *Attorney, Agent, or Firm* — Lee & Hayes P.C.; Bea Koempel-Thomas (57) ABSTRACT

Provided is an power and communications network convergence system including wireless base stations, and DC grid groups, each grid group belonging to a cell. Each grid in the grid group has a DC line to which devices including a power generator and a power-storage are connected, and performs, based on state-information on each device, first control for reducing power fluctuations in the line. A first grid belonging to a cell performs, based on state-information on each grid, second control for interchanging power with a second grid belonging to the cell. If a power situation of a first grid group belonging to a first cell and a power-situation of a second grid group belonging to a second cell satisfy a preset condition, the first grid group performs third control for interchanging power with the second grid group.

7 Claims, 9 Drawing Sheets

(56) References Cited

FOREIGN PATENT DOCUMENTS

| JP | 2014529232 | 10/2014 |
| JP | 2016111893 | 6/2016 |
| JP | 2016154435 | 8/2016 |
| KR | 20160070680 | 6/2016 |
| KR | 102011886 | 8/2019 |
| WO | WO2013172088 | 11/2013 |

OTHER PUBLICATIONS

PCT Search Report for corresponding PCT Application No. PCT/JP2020/011764 dated Jun. 23, 2020, 3 pages.
PCT Written Opinion for corresponding PCT Application No. PCT/JP2020/011764 dated Jun. 23, 2020, 3 pages.
EP Search Report from corresponding EP Patent Application No. 20842666.8 dated Jan. 24, 2022, 6 pages.

* cited by examiner

201: SURVIVAL PRIORITY TABLE

| DEVICE ID | ATTRIBUTE | SURVIVAL PRIORITY | ALLOWABLE CONTROL CONDITIONS |
|---|---|---|---|
| 1002 | MEDICAL DEVICE (HOSPITAL FACILITY) | 100 | STOP POWER SUPPLY: NOT ALLOWED REDUCE POWER SUPPLY: NOT ALLOWED |
| 1004 | EV (PRIVATE BEV) | 1 | STOP POWER SUPPLY: ALLOWED REDUCE POWER SUPPLY: ALLOWED |
| 1005 | EV (PHEV EMERGENCY VEHICLE) | 20 | STOP POWER SUPPLY: ALLOWED REDUCE POWER SUPPLY: ALLOWED |
| ⋮ | ⋮ | ⋮ | ⋮ |
| 1101 | REFRIGERATOR (HOME USE) | 3 (SUMMER) 1 (WINTER) | STOP POWER SUPPLY: ALLOWED REDUCE POWER SUPPLY: ALLOWED |
| 1102 | WASHING MACHINE (HOME USE) | 1 | STOP POWER SUPPLY: ALLOWED REDUCE POWER SUPPLY: ALLOWED |
| 1103 | LAMP (HOME USE) | 3 (NIGHT) 1 (DAY) | STOP POWER SUPPLY: ALLOWED REDUCE POWER SUPPLY: ALLOWED |
| 1104 | AIR CONDITIONER (HOME USE) | 1 (0°C<T<35°C) 10 (Other) | STOP POWER SUPPLY: ALLOWED REDUCE POWER SUPPLY: NOT ALLOWED |
| ⋮ | ⋮ | ⋮ | ⋮ |
| 1201 | CHARGING STATION | 1 | STOP POWER SUPPLY: ALLOWED REDUCE POWER SUPPLY: ALLOWED |
| 1202 | LAMP (SHELTER) | 50 (NIGHT) 10 (DAY) | STOP POWER SUPPLY: NOT ALLOWED REDUCE POWER SUPPLY: ALLOWED |
| 1203 | LAMP (HOSPITAL FACILITY) | 80 | STOP POWER SUPPLY: NOT ALLOWED REDUCE POWER SUPPLY: ALLOWED |
| ⋮ | ⋮ | ⋮ | ⋮ |

| DEVICE IDENTIFICATION | STATE INFORMATION (STATE VARIABLE VECTORS) ||
|---|---|---|
| | CONFIGURATION INFORMATION / SENSOR DATA | STATE PARAMETERS |
| Di | ID, GEOGRAPHIC, GRID MEMBERSHIP, MEC MEMBERSHIP | DERIVATIVE OF FLUCTUATIONS IN AMOUNT OF GENERATED POWER |
| | STATE / PURPOSE / REQUESTS OF POWER GENERATION DEVICE | DERIVATIVE OF FLUCTUATIONS IN AMOUNT OF STORED/RELEASED POWER |
| | STATE / PURPOSE / REQUESTS OF STORAGE BATTERY | DERIVATIVE OF POWER LOAD FLUCTUATIONS |
| | STATE / PURPOSE / REQUESTS OF POWER CONSUMING DEVICE | DERIVATIVE OF POWER CONSUMPTION FLUCTUATIONS |
| | STATE / PURPOSE / REQUESTS OF CONTROL DEVICE | DERIVATIVE OF FLUCTUATIONS IN TRAFFIC VOLUME OF INFORMATION COMMUNICATION |
| | AMOUNT OF $CO_2$ EMISSIONS, TRAFFIC VOLUME OF INFORMATION COMMUNICATION | DERIVATIVE OF $CO_2$ EMISSIONS FLUCTUATIONS |
| | SIGNAL PROCESSING THROUGHPUT, TIME INFORMATION | DERIVATIVE OF SIGNAL PROCESSING THROUGHPUT FLUCTUATIONS |
| | SURVIVAL PRIORITY | (SHORT TERM / MEDIUM TERM / LONG TERM) |
| GRID | INTRA-GRID TOPOLOGY | GLOBAL CONTROL PARAMETERS |
| gDCj | D1 - D2 - D4 - D3 - D5 | GEOGRAPHIC POWER GENERATION DISTRIBUTION |
| | | GEOGRAPHIC POWER STORAGE DISTRIBUTION |
| | | GEOGRAPHIC POWER CONSUMPTION DISTRIBUTION |
| | | GEOGRAPHIC INTERCHANGEABLE POWER DISTRIBUTION |
| | | GEOGRAPHIC COMMUNICATION TRAFFIC DISTRIBUTION |
| | | DERIVATIVES OF FLUCTUATIONS IN GEOGRAPHIC DISTRIBUTIONS |
| | | (SHORT TERM / MIDDLE TERM / LONG TERM) |

POWER AND COMMUNICATIONS NETWORK CONVERGENCE SYSTEM, AND CONTROL METHOD THEREIN

This Application is a US national stage application under 35 USC § 371 of PCT application PCT/JP2020/011764 filed Mar. 17, 2020.

TECHNICAL FIELD

The present disclosure relates to an power and communications network convergence system, and a control method therein.

BACKGROUND ART

Smart cities and compact cities realize Society 5.0, in which the cyber space and the physical space of a CPS (Cyber Physical System) are highly integrated. Such smart cities and compact cities are expected to make urban and regional functions and services more efficient and sophisticated, while achieving both the solution of issues to be addressed by the society, such as decarbonization, and economic developments involving industrial structure innovations based on digital transformation and subscription.

Against the background of an increase in investment considering the three factors of Environment, Social, and Governance (ESG investment), and the adoption of "the 2030 Agenda for Sustainable Development" (Sustainable Development Goals (SDGs)) at the United Nations summit in September 2015, more and more companies are becoming members of RE100 (Renewable Energy 100%). Companies that declare business operation using only renewable energy can join RE100.

The world smart city markets are estimated to reach a cumulative total size of 3100 trillion yen in 20 years from 2010 to 2030. At the core of these markets are energy-related markets, which are expected to be of the sizes of about 720 trillion yen in smart grid related industries, about 310 trillion yen in next-generation automobile related industries such as EV (Electric Vehicle) industries, and about 380 trillion yen in renewable energy related industries. Plans to shift to smart cities have therefore been pursued in many countries and regions, and some of the plans have already been launched.

Patent literature 1 listed below proposes a system in which a communications grid and a power grid are used to interconnect the following elements: distributed power sources, including a photovoltaic power generation system, a wind power generation system, a battery, and a storage system for power; a social infrastructure, including EVs and charging stations; a HEMS (Home Energy Management System) and a BEMS (Building Energy Management System); and a power plant. In particular, patent literature 1 proposes a social infrastructure control system that centrally controls a social infrastructure using an SCMS (Smart Community Management System) by connecting various infrastructures to a cloud computing system over an optical communications network.

CITATION LIST

Patent Literature

[Patent Literature 1]
International Publication No. 2013/172088

SUMMARY OF INVENTION

Technical Problem

Unfortunately, a large power grid such as the one in the above social infrastructure control system involves high costs of establishing and operating a power network and an information and communications network. In addition, such a large power grid is likely to suffer a large scale of damage in the event of, e.g., a natural disaster, arousing concerns about a long period for recovery from the damage. Further, a large system such as a social infrastructure is difficult to optimize only with autonomous, distributed, and coordinated control and requires cooperation with a global-optimization mechanism. This poses the problem of how to coordinate the system and the global-optimization mechanism with each other for enhancing the resilience of the social infrastructure.

In view of the above, according to a perspective of the present disclosure, an object of the present disclosure lies in providing an power and communications network convergence system that integrates a power network and an information and communications network so that they complement each other to enhance the resilience based on the above-mentioned cooperation, and in providing a method of controlling the system.

Solution to Problem

According to an aspect of the present disclosure, an power and communications network convergence system is provided. The system includes: wireless base stations; and direct-current grid groups, each direct-current grid group belonging to a cell formed by a corresponding one of the wireless base stations. Each direct-current grid in the direct-current grid group has a direct-current power line to which electric power devices including a power generation device and a power storage device are connected, and performs, based on state information on each electric power device wirelessly communicated among the electric power devices, first control for reducing power fluctuations over time in the direct-current power line. A first direct-current grid of direct-current grids belonging to a cell performs, based on state information on each direct current grid wirelessly communicated among the direct-current grids, second control for interchanging power with a second direct-current grid belonging to the cell. If a power situation of a first direct-current grid group belonging to a first cell and a power situation of a second direct-current grid group belonging to a second cell satisfy a first preset condition, the first direct-current grid group performs third control for interchanging power with the second direct-current grid group.

Advantageous Effect of Invention

According to the present disclosure, resilience can be enhanced.

DESCRIPTION OF EMBODIMENTS

An embodiment of the present disclosure will be described below with reference to the accompanying drawings. Throughout the specification and the drawings, elements having substantially like functions may be given like symbols and not be repeatedly described.

Before describing the embodiment of the present disclosure, problems to be solved for realizing smart cities and compact cities will be described.

In the ICT (Information and Communication Technology) field, technological innovation is being accelerated using AI (Artificial Intelligence), big data, and IoT (Internet of Things). A problem in this field is an increase in information processing load due to the influx of traffic into data centers. Another serious problem is a surge in power consumption resulting from the increased information processing load. To address these problems, 5G (the fifth-generation mobile communications system) and B5G (Beyond 5G) are expected to introduce MEC, which allows information to be processed in wireless base stations (edges) that centralize accesses from terminals.

In a 5G or B5G system, a wireless network is constructed with edges and antenna groups extending from the respective edges. For example, each edge has BBUs (Base Band Units), and a group of antennas of RRHs (Remote Radio Heads) connected to the respective BBUs is used to form a macro-cell that covers terminals. Each RRH forms a small cell (such as a nanocell, picocell, or femtocell), and a set of small cells forms the macro-cell. A problem in such a system is how to supply power to the edges and antenna groups distributed over a wide area.

In the light of environmental considerations and the enhancement of resilience, research and development are carried out in the field of the electric power, from various viewpoints for the realization of a distributed energy system that uses renewable energy, while taking into account cooperation with an existing power system. For example, simulations of a virtual power plant for incorporating renewable energy into a power system, and simulations of small power grids (direct-current grids) formed of direct-current power lines (DC lines) have been performed. A problem in this regard is power loss caused by AC/DC conversion in supplying power from an existing power system to direct-current grids, and in interchanging power between direct-current grids.

Supplying power to residential districts and business districts that adopt ICT, EVs, ZEHs (Zero Emission Houses), and ZEBs (Zero Emission Buildings) requires direct-current grids supporting different power supply-reception characteristics of the different districts. However, it is actually impossible for a data center to centrally optimize the direct-current grid group that requires such complex control. This poses the problem of how to optimize a direct-current grid group having different power supply-reception characteristics.

A further problem in realizing smart cities and compact cities is how to effectively utilize EVs, which can be used as means for carrying humans and things or as portable storage batteries. Regarding the utilization of EVs, mechanisms being studied these days introduce the concept of MaaS (Mobility as a Services) to coordinate EVs with a direct-current grid group. While utilizing EVs will improve the ability to supply and wheel power to direct-current grids, high-voltage and high-power quick charging of an EV at a charging station causes a sharp change in power load in a direct-current grid. This necessitates an active technique of power load control for ensuring stable power supply to other devices connected to the direct-current grid.

(1. System configuration of Power and communications network convergence system) In view of the above various problems, an embodiment of the present disclosure proposes an power and communications network convergence system that provides an electric power and communications infrastructure for realizing smart cities and compact cities. This power and communications network convergence system provides a new network platform that can be economically and efficiently operated with high resilience. This system enables massive introduction of economical renewable energy, while contributing to the creation of an Urban OS (Operating System) that can promptly and flexibly address increasingly efficient and sophisticated urban and regional functions and services and industrial structure changes.

Figure 1:
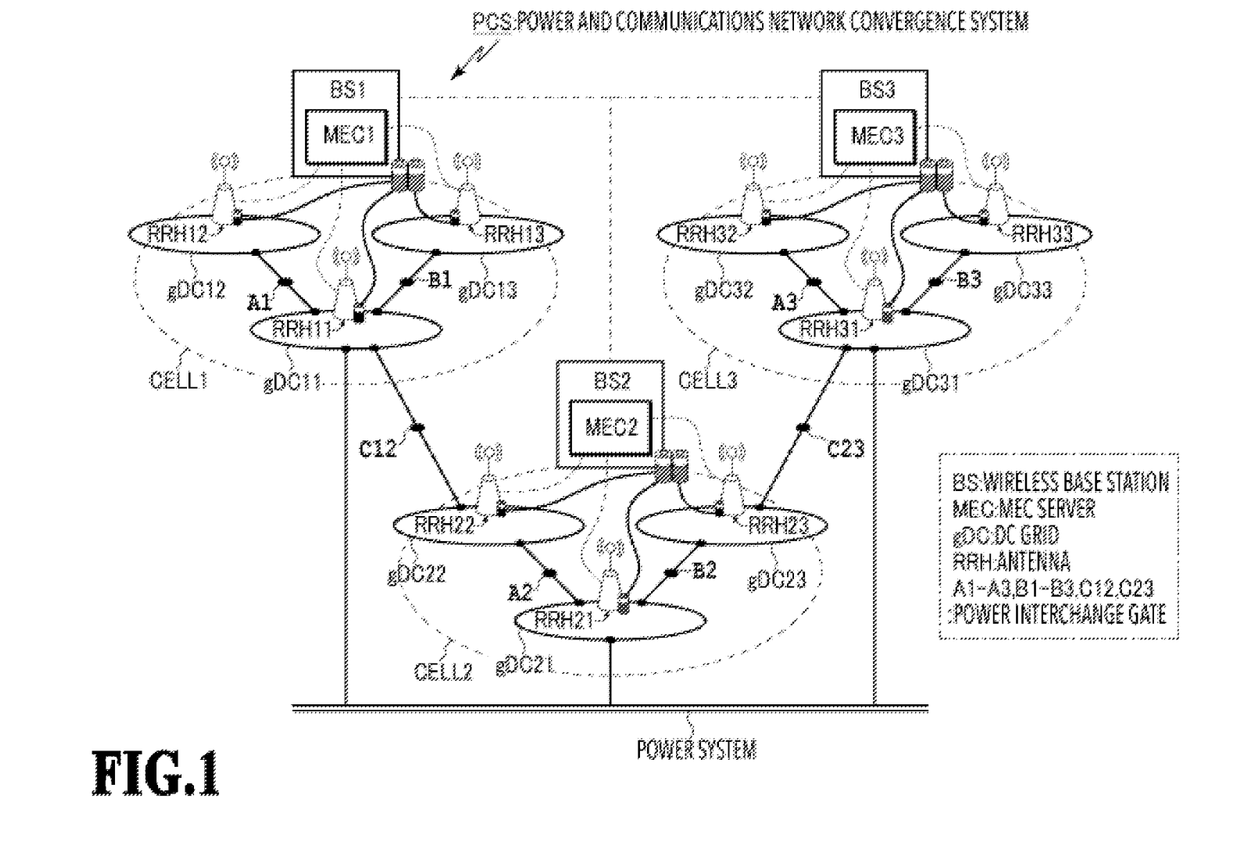
FIG. 1 is a schematic diagram for describing a system configuration of an power and communications network convergence system according to an embodiment.

First, a system configuration of the power and communications network convergence system according to the embodiment will be described with reference to FIG. 1. FIG. 1 is a schematic diagram for describing a system configuration of the power and communications network convergence system according to the embodiment. It is to be noted that an power and communications network convergence system PCS shown in FIG. 1 is a mere example of the power and communications network convergence system according to the embodiment.

The power and communications network convergence system PCS includes wireless base stations and direct-current grid groups, each group belonging to a cell formed by a corresponding wireless base station. In the example in FIG. 1, the power and communications network convergence system PCS includes wireless base stations BS1, BS2, and BS3. The BS1, BS2, and BS3 may each be a wireless base station that supports a high-speed, wide-bandwidth wireless communications network such as 5G or B5G, or a facility that houses such a wireless base station. Although three wireless base stations are shown for simplicity, more or fewer than three wireless base stations may be included in the power and communications network convergence system PCS. The BS1, BS2, and BS3 form respective cells CELL1, CELL2, and CELL3. The CELL1, CELL2, and CELL3 may each be a macro-cell that covers a diameter of several km.

In the example in FIG. 1, the cell CELL1 covers a direct-current grid group that includes direct-current grids gDC11, gDC12, and gDC13. The cell CELL2 covers a direct-current grid group that includes direct-current grids gDC21, gDC22, and gDC23. The cell CELL3 covers a direct-current grid group that includes direct-current grids gDC31, gDC32, and gDC33. In the example in FIG. 1, dashed ellipses schematically illustrate the coverage areas of the CELL1, CELL2, and CELL3. Although each cell covers three direct-current grids for simplicity, each cell may cover more or fewer than three direct-current grids.

Each direct-current grid in each direct-current grid group has a direct-current power line (hereafter referred to as a DC line), to which multiple electric power devices, including power generation devices and power storage devices, are connected. In the example in FIG. 1, solid ellipses schematically illustrate the DC lines. Power consuming devices are also connected to the DC lines. A power generation device may be a renewable energy source such as a photovoltaic power generation facility, a wind power generation facility, or a geothermal power generation facility. A power storage device may be a battery unit formed of one or more storage batteries. An electric vehicle such as a BEV (Battery Electric Vehicle) or a PHEV (Plug-in Hybrid Electric Vehicle) may be used as a power storage device. A power consuming device may be a residential environment such as a ZEH or a ZEB, an electric appliance such as an air conditioner or a refrigerator, or a charging station for charging electric vehicles.

Based on state information on each electric power device wirelessly communicated among electric power devices, each direct-current grid performs first control for reducing power fluctuations over time in the DC line. In a cell to which direct-current grids belongs, a first direct-current grid performs, based on state information on each direct-current grid wirelessly communicated among the direct-current grids, second control for interchanging power with a second direct-current grid.

Each wireless base station has an MEC server. For example, the wireless base stations BS1, BS2, and BS3 have respective MEC servers MEC1, MEC2, and MEC3. The MEC1, MEC2, and MEC3 each have the function of collecting and communicating information internally and externally to the corresponding DC grids.

Each electric power device in each DC grid can use the information collection and communication function of the MEC server to know the power generation/storage/consumption situations of the device, and the current states of the device with reference to the normal operation states. Based on these situations and states, the electric power device can recognize requests to other devices, such as power supply requests and power storage requests. Each electric power device in each DC grid can also use the information collection and communication function of the MEC server to know the power generation/storage/consumption situations of other devices, and the current states of other devices with reference to the normal operation states. Based on these situations and states, the electric power device can recognize requests to other devices, such as power supply requests and power storage requests.

Each electric power device in each direct-current grid holds control information defining a rule for autonomous control, and according to the rule, determines its own operations to be performed at the next time step. The rule indicated by the control information held in each electric power device defines actions to be taken at the device's discretion for smoothing the power in the DC line according to state changes in the device resulting from power supply or reception. Each electric power device autonomously operates according to this rule, so that each direct-current grid can realize power smoothing in the DC line with autonomous and distributed control (first control). The control in the direct-current grid is not limited to the rule-based control scheme described here but may adopt various control schemes, for example feedback control. If a direct-current grid is short of power and an adjacent direct-current grid has extra power, power is provided from the adjacent direct-current grid; how the power provided is controlled within the direct-current grid can be arbitrarily determined.

Each direct-current grid has the ever-fluctuating power generation ability, power generation state, power storage ability, power storage state, and power load. Performing the above autonomous and distributed control, however, can cancel these fluctuations and stabilize power supply and reception. In the above embodiment, the devices share information via the MEC server. Each device may, at the device's discretion according to the preset autonomous control rule, determine the amounts of power to be generated, stored, and consumed, and states such as connection to/disconnection from the DC line, at the next time step. The power in the direct-current grid may also be controlled based on other control schemes, such as feedback control. Thus, power supply and reception can be smoothed in an autonomous, distributed, and coordinated manner.

Information is also shared among the direct-current grids in the area managed by an MEC server (the area corresponding to the above-described cell) via the MEC server. Sharing information among the direct-current grids in this manner enables power interchange and autonomous and distributed control between direct-current grids (second control). Power interchange between direct-current grids is performed via power interchange gates that connect the direct-current grids. For example, the CELL1 includes a power interchange gate A1 connecting the gDC11 and the gDC12, and a power interchange gate B1 connecting the gDC11 and the gDC13. The power interchange gates A1 and B2 can control the amount of power interchanged between the direct-current grids and its direction. The autonomous and distributed control across direct-current grids can smooth power supply and reception within the area managed by an MEC server.

Information is also shared among MEC servers. For example, MEC servers adjacent to each other can share information with relatively low delay because their communication delay is within a sufficiently narrow range and is allowable. Consequently, direct-current grids of wireless base stations in areas adjacent to each other can smooth power supply and reception with autonomous and distributed control. For example, the direct-current grid group covered by the CELL1 may perform third control for interchanging power with the direct-current grid group of the adjacent CELL2. This may be performed based on power situations (such as the power generation ability, the power generation state, the power storage ability, the power storage state, and the power load) of the direct-current grid groups covered by the CELL1 and CELL2.

As above, sharing information among MEC servers enables power interchange and autonomous and distributed control between direct-current grids managed by different MEC servers (third control). Again, power interchange between direct-current grids managed by different MEC servers is performed via power interchange gates that connect specific direct-current grids. The example in FIG. 1 includes a power interchange gate C12 connecting the gDC11 in the CELL1 and the gDC22 in the CELL2, and a power interchange gate C23 connecting the gDC23 in the CELL2 and the gDC31 in the CELL3. The power interchange gates C12 and C23 can control the amount of power interchanged between the direct-current grids and its direction. The autonomous and distributed control across direct-current grids managed by different MEC servers can smooth power supply and reception in areas adjacent to each other.

The above autonomous, distributed, and coordinated control for smoothing power supply and reception may not function effectively if the power supply-reception balance exceeds a certain limit. For example, each device, each direct-current grid, and each direct-current grid group may autonomously act to smooth power supply and reception according to rules. If, then, the amounts of power generation, power consumption, and/or power load fluctuation adjustable by these autonomous acts are exceeded, the interchange of power beyond what each direct-current grid can locally generate or consume may be required. In such cases, in the power and communications network convergence system PCS, an MEC server or a cloud system connected to the MEC servers (for example, a cloud system 20 to be described below) takes the initiative in performing control (global optimization/centralized control). This includes cooperative control with the power system (fourth control), or control such as power interchange between direct-current grids in distant areas.

Here, elements of the power and communications network convergence system PCS will be further described.

As shown in FIG. 1, each cell has RRHs corresponding to the direct-current grids, and each RRH provides a wireless environment to the corresponding direct-current grid. Each RRH forms a small cell, and a set of small cells forms a cell (macro-cell) corresponding to a wireless base station. For example, the wireless environments for the gDC11, gDC12, and gDC13 are provided by the RRH11, RRH12, and RRH13, respectively. Each RRH is connected to an optical fiber (dark fiber) cable extending from the wireless base station. Power is supplied to each RRH via a copper cable (dry copper) extending from the wireless base station. In a variation, power may be supplied to each RRH from the corresponding DC line. In the direct-current grid group managed by an MEC server, only one direct-current grid may be connected to the power system.

Figure 2:
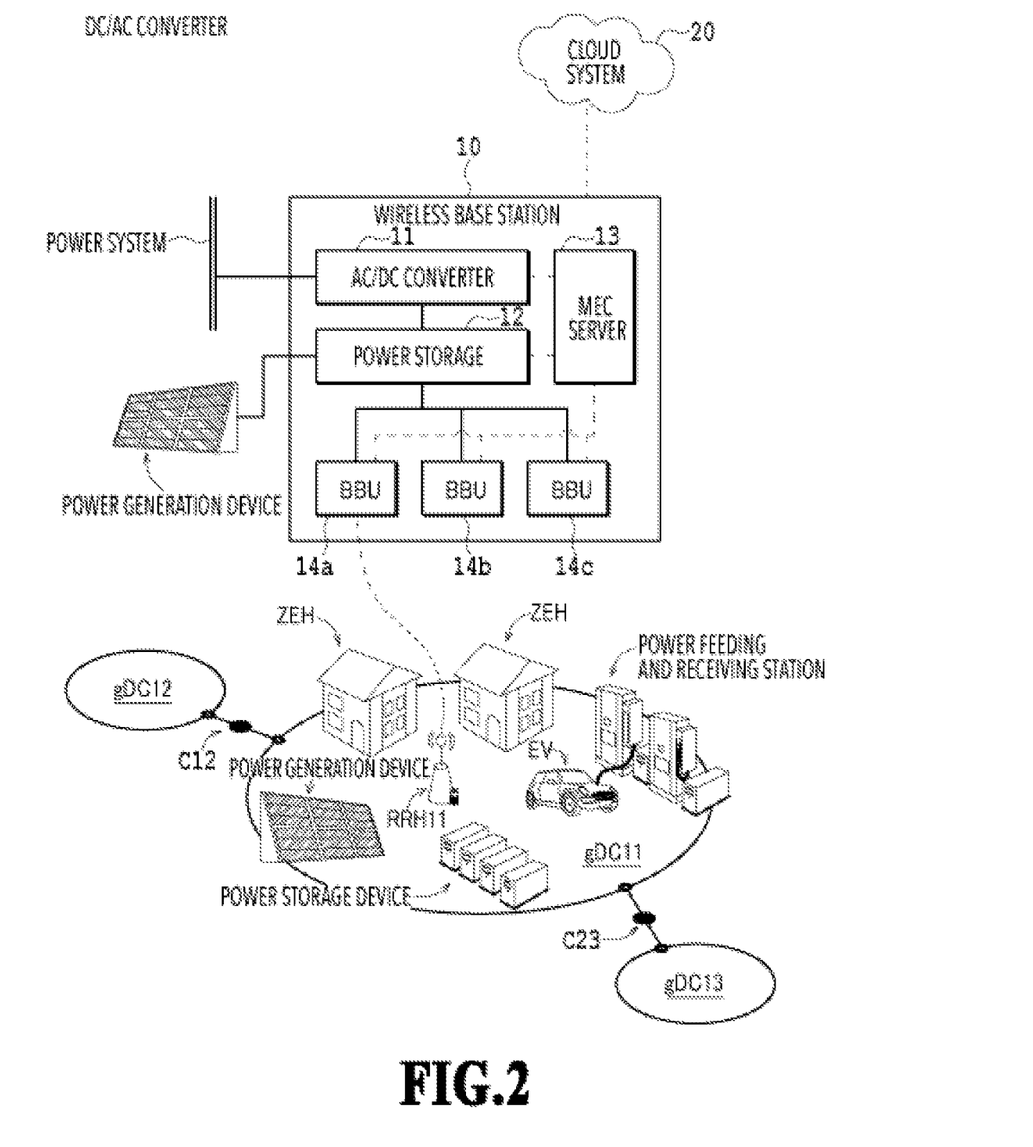
FIG. 2 is a schematic diagram for describing a configuration of a wireless base station according to the embodiment.

Now, a configuration of the wireless base stations according to the embodiment will be further described with reference to FIG. 2. FIG. 2 is a schematic diagram for describing a configuration of the wireless base stations according to the embodiment. It is to be noted that a wireless base station 10 shown in FIG. 2 is a mere example of the wireless base stations according to the embodiment. The configuration of the wireless base station 10 is applicable to the above-described BS1, BS2, and BS3, or other wireless base stations not shown in FIG. 1. For simplicity, a case in which the wireless base station 10 is used as BS1 will be described.

As shown in FIG. 2, the wireless base station 10 includes an AC/DC converter 11, a power storage 12, an MEC server 13, and BBUs 14a, 14b, and 14c.

The AC/DC converter 11 converts DC power into AC power. For example, the AC/DC converter 11 converts AC power supplied from the power system into DC power and stores the DC power in the power storage 12. The power storage 12 includes one or more storage batteries. A power generation device such as a renewable energy source may be connected to the power storage 12. The power stored in the power storage 12 is supplied as driving power to the MEC server 13 and the BBUs 14a, 14b, and 14c. The power may also be supplied to the RRHs, which are connected to the BBUs 14a, 14b, and 14c via dark fiber cables, from the power storage 12 via dry copper cables.

The MEC server 13, having the information collection and communication function, collects information from and transmits information to the devices in its direct-current grid group via the BBUs 14a, 14b, and 14c and the RRHs connected to the BBUs. The MEC server 13 also shares information with MEC servers in other neighboring wireless base stations. The MEC servers may share information via lines of a backbone network that connects the wireless base stations. The MEC server 13 may control the operations of the AC/DC converter 11, the power storage 12, and the BBUs 14a, 14b, and 14c.

Figure 3:
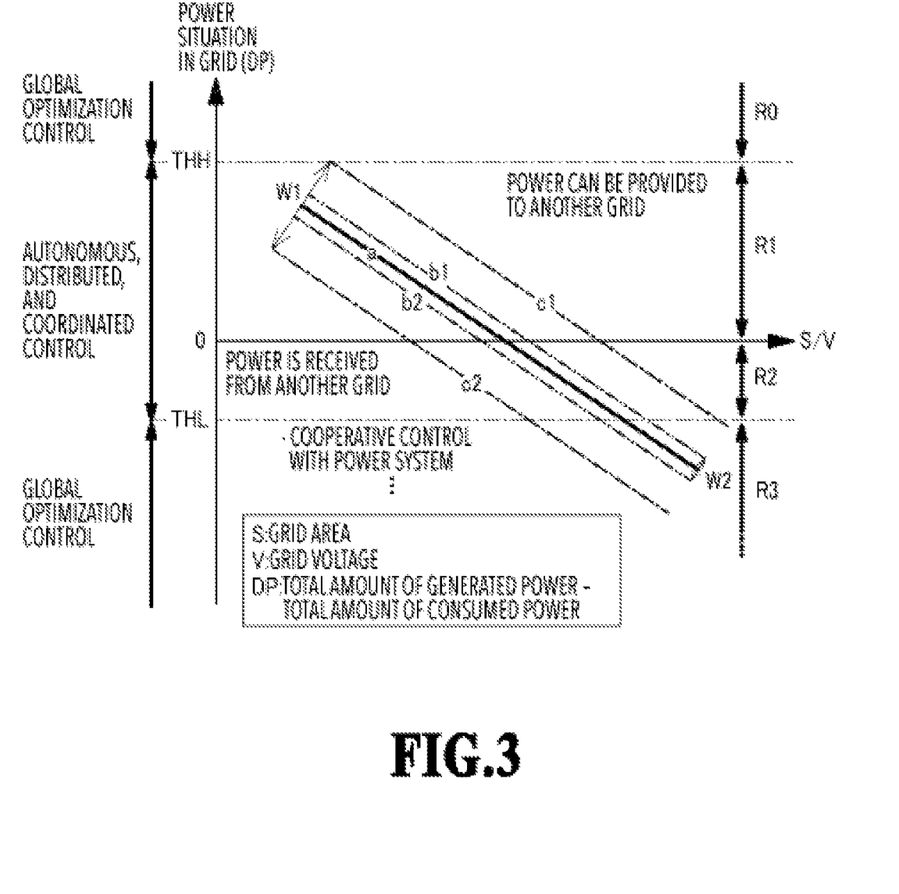
FIG. 3 is a diagram for describing the scalability of a direct-current grid according to the embodiment.

Here, the scalability of a direct-current grid according to the embodiment will be described with reference to FIG. 3. FIG. 3 is a diagram for describing the scalability of a direct-current grid according to the embodiment.

In the graph in FIG. 3, the ordinate indicates the power situation in the grid (DP), and the abscissa indicates the ratio between the grid area and voltage (SN). DP is a value of the total amount of power generated minus the total amount of power consumed in the target direct-current grid. S denotes the area of the target direct-current grid, which is a parameter proportional to the copper loss in the target direct-current grid. The absolute value and the allowable range of S may significantly depend on the geological distribution of and the topology of the devices in the target direct-current grid. V denotes voltage in the DC line of the target direct-current grid. The relationship between DP and SN may be represented as a downward-sloping line labeled "a" (hereafter referred to as a "line a").

Because the direct-current grids have the ever-fluctuating power generation ability, power generation state, power storage ability, power storage state, and power load, the line a may fluctuate up and down over time. Without the above-described power smoothing in the direct-current grid, the fluctuation would range from c1 to c2, with W1 being the fluctuation width of the line a. By contrast, with the above-described power smoothing in the direct-current grid, the fluctuation is within the range b1 to b2, with W2 being the fluctuation width of the line a. The power smoothing in the direct-current grid may adopt the above-described control scheme in which each electric power device autonomously performs appropriate operations according to a predetermined rule, or other control schemes such as feedback control.

If DP is above 0, the target direct-current grid can provide power to another direct-current grid (R0 or R1). If DP is slightly below 0 (R2), a power interchange gate that connects the target direct-current grid and another direct-current grid managed by the same MEC server is controlled to autonomously perform control for receiving power from the other direct-current grid. If DP is still not improved after this control, a power interchange gate that connects the target direct-current grid and another direct-current grid managed by another MEC server in an adjacent area is controlled to autonomously perform control for receiving power from the other direct-current grid in the adjacent area.

In the ranges where the target direct-current grid can provide power to another direct-current grid (R0 and R1), R0 is a range where a grid in need of power exists among neighboring grids, and power interchange and power smoothing can be realized with inter-grid autonomous, distributed, and coordinated control. By contrast, R1 is a range where the target direct-current grid can provide power to another grid, but no other neighboring grids have a power shortage sufficient for receiving the extra power. Global optimization is then required for centrally controlling power interchange via the power system.

If the above power interchange fails to recover DP, resulting in DP lower than or equal to a threshold THL, or higher than or equal to a threshold THH (R0 or R3), the control switches from the autonomous, distributed, and coordinated control to the global optimization control, in which the cloud system 20 performs centralized control. For example, once the control switches to the global optimization control, the direct-current grid group that includes the target direct-current grid may receive power from the power system in response to an instruction from the cloud system 20. In the global optimization control, the target direct-current grid may receive power from a direct-current grid managed by another MEC server in a geographically distant area in response to an instruction from the cloud system 20. In this case, the target direct-current grid may receive power from the power system as well. In a variation, the instruction for the global optimization control may be made by one representative MEC server or by MEC servers communicating with each other.

Thus, the information collection and communication function of the MEC server 13 can be used to share information among devices, among direct-current grids, and among direct-current grid groups. This can realize the autonomous, distributed, and coordinated control within a direct-current grid, between direct-current grids, and between direct-current grid groups, as described above. If DP of the target direct-current grid is not sufficiently improved with the autonomous, distributed, and coordinated control, DP can be improved with the global optimization control, such as cooperation with the power system or wide-area power interchange.

The autonomous, distributed, and coordinated control is performed first, thereby realizing local power generation and consumption. The power smoothing control is autonomously performed on a device basis, grid basis, grid group basis (MEC server management basis), and adjacent grid group basis. Therefore, if a failure occurs in some of these elements, the control can be continued while minimizing the influence of the failure. Further, in the event of, e.g., a disaster, the undamaged remaining elements can provide a power and communications environment as much as possible. If a failure occurs in the communications infrastructure, an ad hoc network can be established to repair the communications network environment in response to an instruction from the cloud system 20. Then, in at least part of the area corresponding to the repaired point, the above-described autonomous, distributed, and coordinated control can resume power supply to contribute to a rapid recovery.

Figure 4:
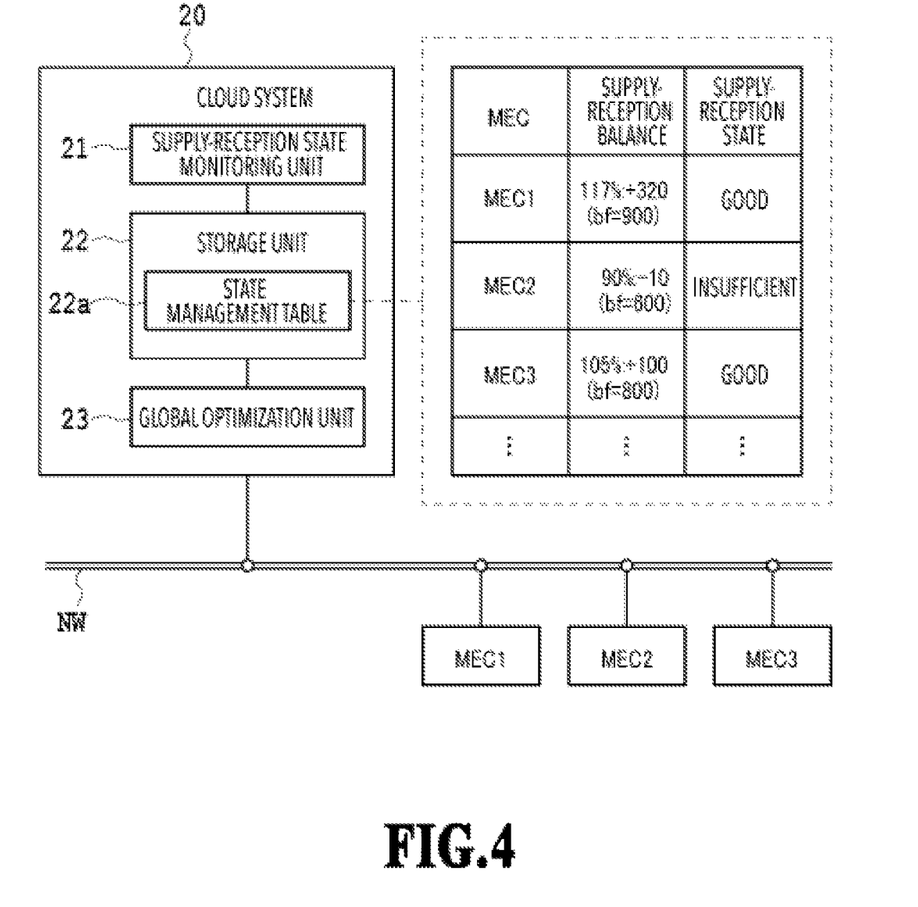
FIG. 4 is a block diagram for describing functions of the cloud system according to the embodiment.

(Functions of Cloud system) Now, functions of the cloud system 20 will be further described with reference to FIG. 4. FIG. 4 is a block diagram for describing functions of the cloud system according to the embodiment of the present disclosure.

As shown in FIG. 4, the cloud system 20 includes a supply-reception state monitoring unit 21, a storage unit 22, and a global optimization unit 23.

The supply-reception state monitoring unit 21 receives information about a supply-reception balance transmitted from the MEC server of each wireless base station in the power and communications network convergence system PCS. Based on the received information about the supply-reception balance, the supply-reception state monitoring unit 21 updates information for managing the supply-reception balance of the direct-current grid group managed by each MEC (a state management table 22a in the storage unit 22). As shown in FIG. 4, the state management table 22a includes identification information, the supply-reception balance, and the supply-reception state for each MEC. The identification information on each MEC is an example of information that can be used to identify the direct-current grid group managed by the MEC. The supply-reception state is, for example, "good" for sufficiency rates above or equal to 100% and "insufficient" for sufficiency rates below 100%.

The global optimization unit 23 refers to the state management table 22a to provide an instruction to a direct-current grid group in the "insufficient" supply-reception state (for example, the direct-current grid group managed by the MEC2). This instruction may instruct, depending on the supply-reception balance, to receive power from the power system, perform power control based on survival priority, or perform power interchange with a direct-current grid group managed by a distant MEC. For example, to an MEC managing a direct-current grid group in the "insufficient" supply-reception state, the global optimization unit 23 issues the above instruction if the absolute value of the extra power falls to or below a predetermined fraction (for example, 50%) of buffer power ("600" for the MEC2).

For example, if power is to be received from a distant direct-current grid group, the global optimization unit 23 selects, among MECs in the "good" supply-reception state, an MEC managing a direct-current grid group that is to provide power. The global optimization unit 23 also determines the amount of power to be requested from the MEC selected. As an example, the global optimization unit 23 selects one or more MECs in descending order of extra power rate (=sufficiency rate−100%) and determines the amounts of power corresponding to the extra power rates to be the amounts of power to be requested from the MECs selected. The global optimization unit 23 notifies the power-providing MECs of information on the power-receiving MEC and the amounts of power to be provided, and notifies the power-receiving MEC of information on the power-providing MECs and the amounts of power to be received. The global optimization unit 23 then instructs to start power interchange.

In the above description, the cloud system 20 manages the state management table 22a and instructs to perform control. In a variation, MEC servers in the power and communications network convergence system PCS may communicate information with each other to perform power interchange (variation #1). In another variation, one of the MEC servers in the power and communications network convergence system PCS may be selected as a representative MEC server, which may control power interchange instead of the cloud system 20 (variation #2).

Figure 5:
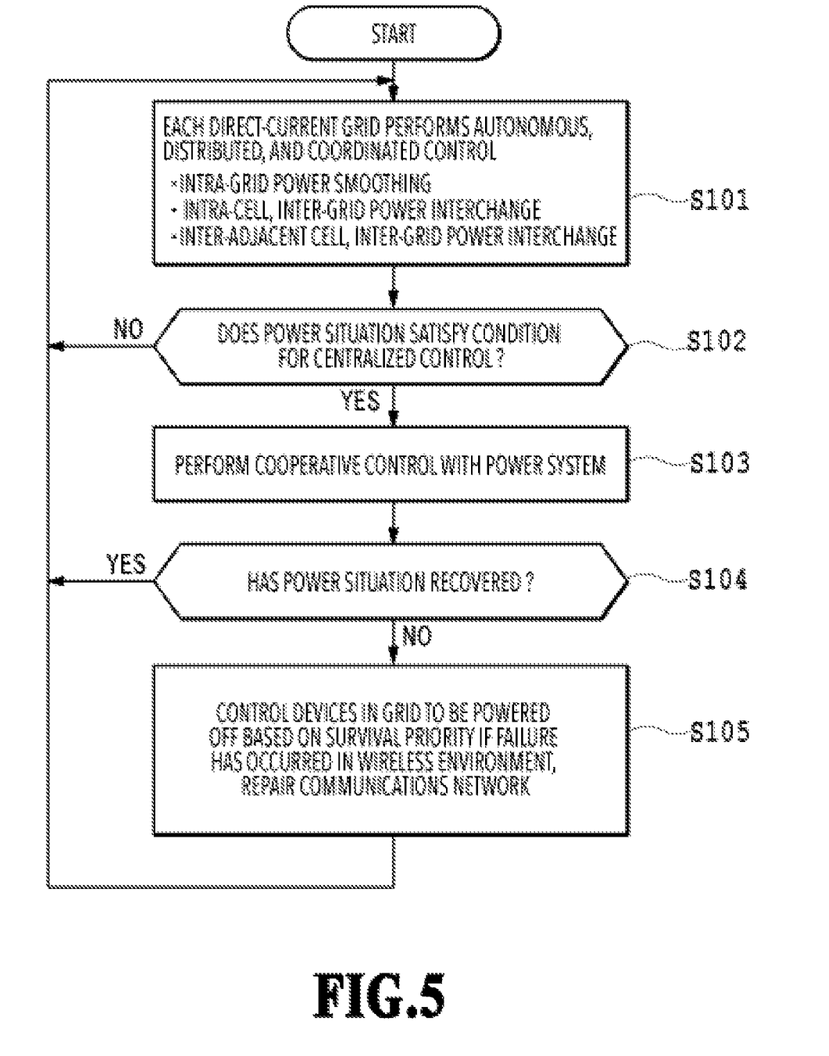
FIG. 5 is a flowchart for describing a flow of autonomous, distributed, and coordinated control and global optimization control according to the embodiment.

Now, a flow of the autonomous, distributed, and coordinated control and the global optimization control according to the embodiment will be described with reference to FIG. 5. FIG. 5 is a flowchart for describing a flow of the autonomous, distributed, and coordinated control and the global optimization control according to the embodiment.

At S101, each direct-current grid performs the autonomous, distributed, and coordinated control.

For example, in each direct-current grid, each device in the direct-current grid autonomously operates according to a first rule that defines operations for smoothing the power in the direct-current grid (intra-grid power smoothing). In the direct-current grid group managed by an MEC server (the group of direct-current grids in the same cell), each direct-current grid autonomously operates according to a second rule that defines operations for smoothing the power in the direct-current grid group (intra-cell, inter-grid power interchange). Of direct-current grid groups managed by MEC servers in areas adjacent to each other (direct-current grid groups in cells adjacent to each other), each direct-current grid group autonomously operates according to a third rule that defines operations for smoothing the power in the direct-current grid group (inter-adjacent cell, inter-grid power interchange).

At S102, the supply-reception state monitoring unit 21 of the cloud system 20 monitors the power situation of each direct-current grid group collected from each MEC server. The global optimization unit 23 determines whether any direct-current grid group has a power situation satisfying a predetermined condition for centralized control (such as a condition that DP in FIG. 3 is lower than or equal to THL, or higher than or equal to THH). If no direct-current grid group satisfies the centralized control condition, the process proceeds to S101. If any direct-current grid group satisfies the centralized control condition, the process proceeds to S103.

At S103, the global optimization unit 23 instructs the direct-current grid group satisfying the centralized control condition to perform cooperative control with the power system via the MEC server. In response to this instruction, the MEC server of the target direct-current grid group performs control for receiving power from the power system.

At S104, the global optimization unit 23 determines whether the power situation has recovered in the direct-current grid group instructed to perform cooperative control with the power system. For example, if the power situation no more satisfies the centralized control condition (if DP in FIG. 3 is within the range between THL and THH that allows the autonomous, distributed, and coordinated control), the global optimization unit 23 determines that the power situation has recovered. If the power situation has recovered, the instruction to cooperate with the power system is cleared and the process proceeds to S101. If the power situation has not recovered, the process proceeds to S105. For example, the process may proceed to S105 if a failure in the power system due to, e.g., a natural disaster prevents the recovery of the power situation.

At S105, the global optimization unit 23 controls the devices in the target direct-current grid to be powered off based on a survival priority assigned to each device. In a variation, instead of being powered off, the devices may have the supplied power reduced or may be switched to power-saving mode. If a failure has occurred in the wireless environment, the global optimization unit 23 repairs the communications network by instructing the MEC server of the target wireless base station and MEC servers of adjacent wireless base stations to form an ad hoc network. Upon completion of the processing in S105, the process proceeds to S101. After the process proceeds to S101, the autonomous, distributed, and coordinated control is performed with the power-controlled devices and in the repaired communication environment. The surviving devices thus continue providing the power and communications environment.

Figure 6:
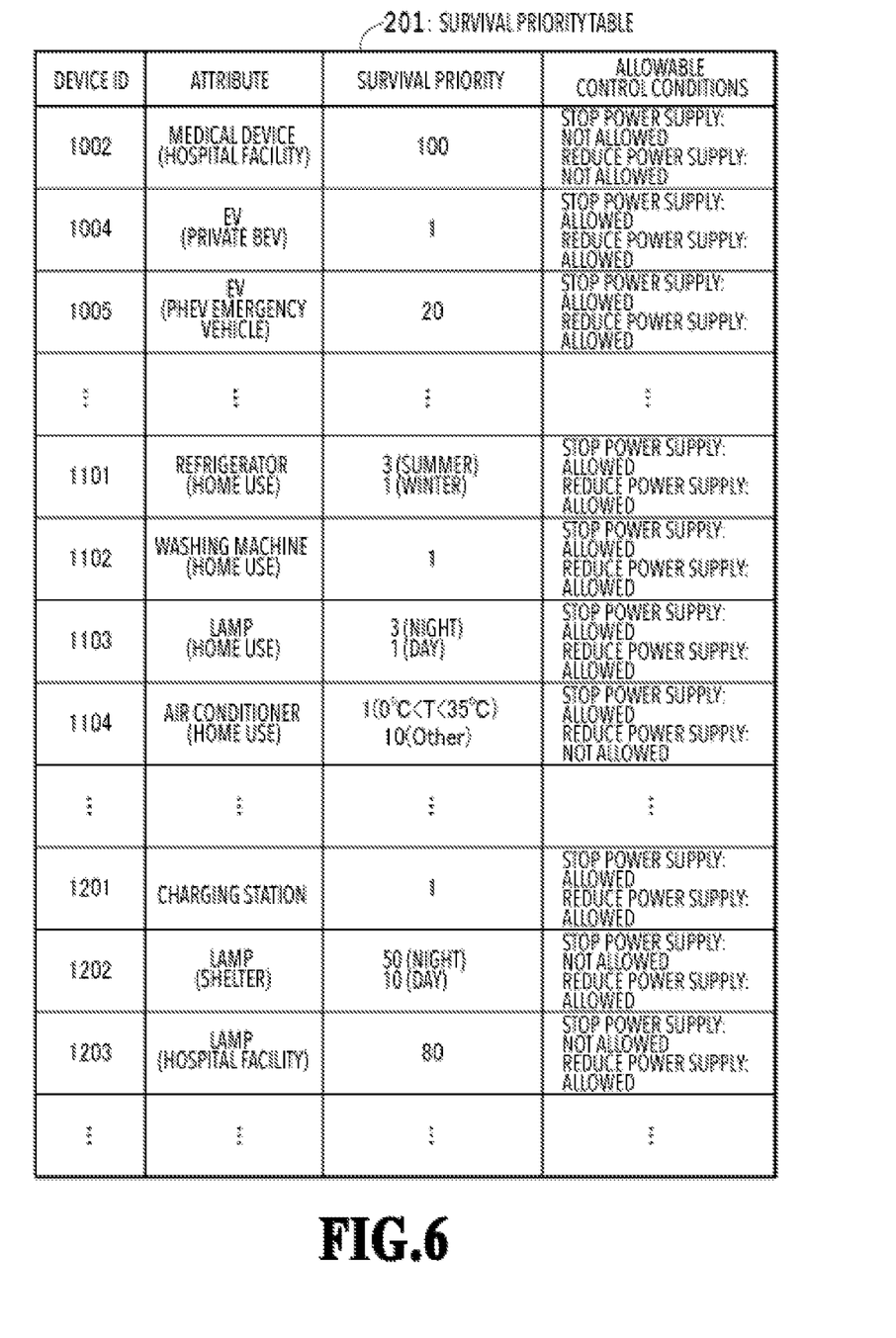
FIG. 6 is a diagram showing an example of a survival priority table according to the embodiment.

Here, the survival priority according to the embodiment will be described with reference to FIG. 6. The survival priority is preset for power consuming devices that consume power among the electric power devices. When the global optimization unit 23 of the cloud system 20 instructs power-off or power-reduction of devices, the global optimization unit 23 performs control for power-off or power-reduction of power consuming devices in ascending order of survival priority. For example, the global optimization unit 23 manages survival priority information in a survival priority table as shown in FIG. 6. FIG. 6 is a diagram showing an example of the survival priority table according to the embodiment.

It is to be noted that a survival priority table 201 shown in FIG. 6 is a mere example of the survival priority table according to the embodiment.

The survival priority table 201 has columns of device ID, attribute, survival priority, and allowable control conditions. The device ID column contains IDs for identifying devices. The attribute column contains information such as the type of each device, the place where the device is used, and the purpose of use. The survival priority column contains the values of survival priorities. In the example in FIG. 6, some cells in the survival priority column contain survival priorities and conditions for applying the respective survival priorities. If a condition is satisfied, the corresponding survival priority is applied.

For example, different survival priorities may be set for environmental conditions such as seasons (summer/winter), time zones (night/day), and outside air temperature ranges (T). If an air conditioner is powered off at outside air temperatures below freezing or above 35° C., it may lead to failing health, development of an acute disease, and in the worst case, death. As such, relatively high survival priorities are preferably associated with certain environmental conditions.

The allowable control conditions column contains information indicating which control operations are allowed on each device to be controlled. For example, a device with the device ID 1002 is a medical device in a hospital facility. Because this device is essential for patients' lives, the survival priority is set to a high value (100) and the allowable control conditions are set to "stop power supply: not allowed" and "reduce power supply: not allowed". "Stop power supply" is control to power off the device and stop power supply to the device. "Reduce power supply" is control to switch the operation mode of the device to power-saving mode and reduce power supply to the device. For example, power supply can be reduced by switching from quick charging mode to normal charging mode, or by switching to a charging mode that uses lower voltage and lower power than in normal charging mode.

Here, a variation of control will be described for a case where a charging station for charging electric vehicles is connected to a direct-current grid. High-voltage and high-power quick charging of an electric vehicle at the charging station causes a sharp change in power load in the direct-current grid. To address this, some charging stations have a power storage device for charging electric vehicles that is independent from the direct-current grid. The global optimization unit 23 may then instruct the charging station to disconnect from the direct-current power line and use the power of the independent power storage device to continue charging electric vehicles.

Figure 7:
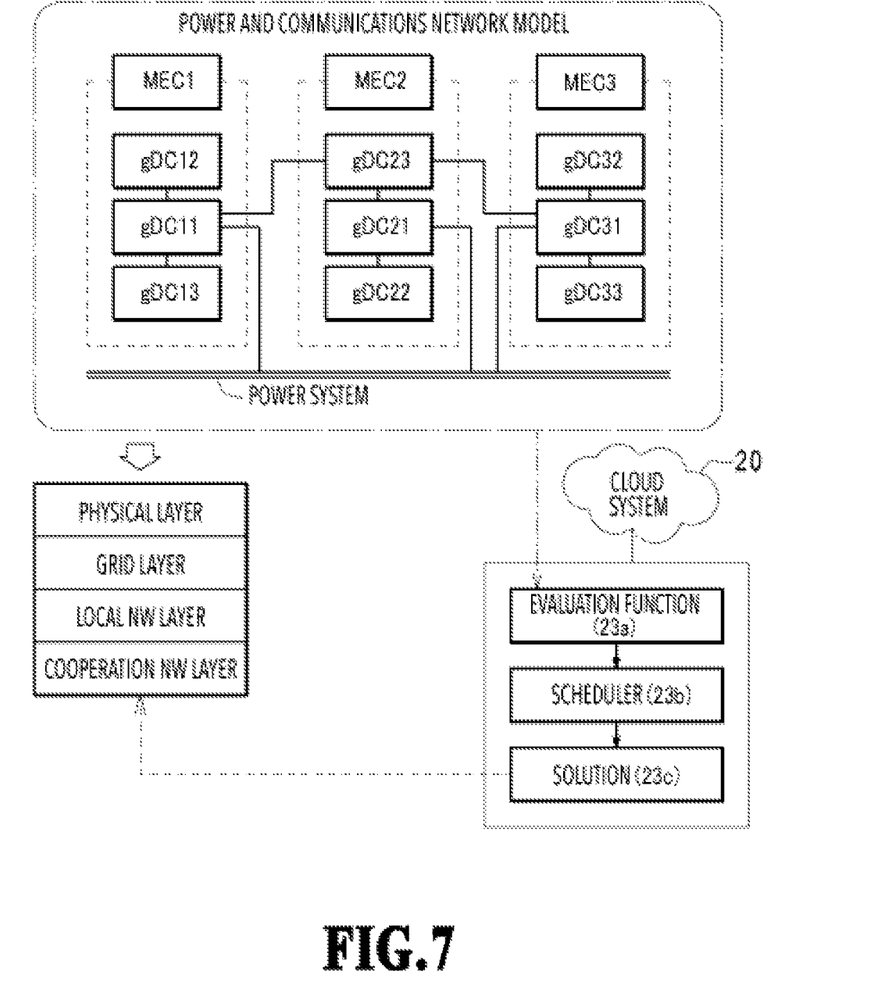
FIG. 7 is a diagram for describing an exemplary power and communications network model and the global optimization control according to the embodiment.

Now, an exemplary power and communications network model and the global optimization control according to the embodiment will be described with reference to FIG. 7. FIG. 7 is a diagram for describing an exemplary power and communications network model and the global optimization control according to the embodiment.

The power and communications network convergence system PCS may be modeled by a power and communications network model as shown in the upper part of FIG. 7. In this model, dashed lines represent the membership of the direct-current grids in the information and communications networks provided by the MEC servers. Solid lines represent electric connections between direct-current grids and the power system, and electric connections between direct-current grids.

Conceptually, this model can be divided into the following layers. A physical layer models the voltage and current distributions and their fluctuations over time of the generated power, supplied power, stored power, and consumed power of the elements constituting the direct-current grids. A grid layer models the elements in the direct-current grids. A local network layer models the network of the group of direct-current grids in each cell. A cooperation network layer models the set of direct-current grid groups belonging to the different cells. Control in the physical layer, the grid layer, and the local network layer corresponds to the above-described autonomous, distributed, and coordinated control. Control in the cooperation network layer corresponds to the above-described centralized control by the cloud system 20, such as cooperation with the power system and wide-area grid cooperation.

In the above-described centralized control, information collected by the supply-reception state monitoring unit 21 of the cloud system 20 via the MEC servers (state information) is evaluated with a predetermined evaluation function 23a of the cloud system 20. A scheduler 23b of the cloud system 20 is then used to determine which direct-current grids, devices, and/or power interchange gates are to be controlled at which points of time. The result of the determination is a solution 23c, which is reflected in the control in the cooperation network layer.

Figure 8:
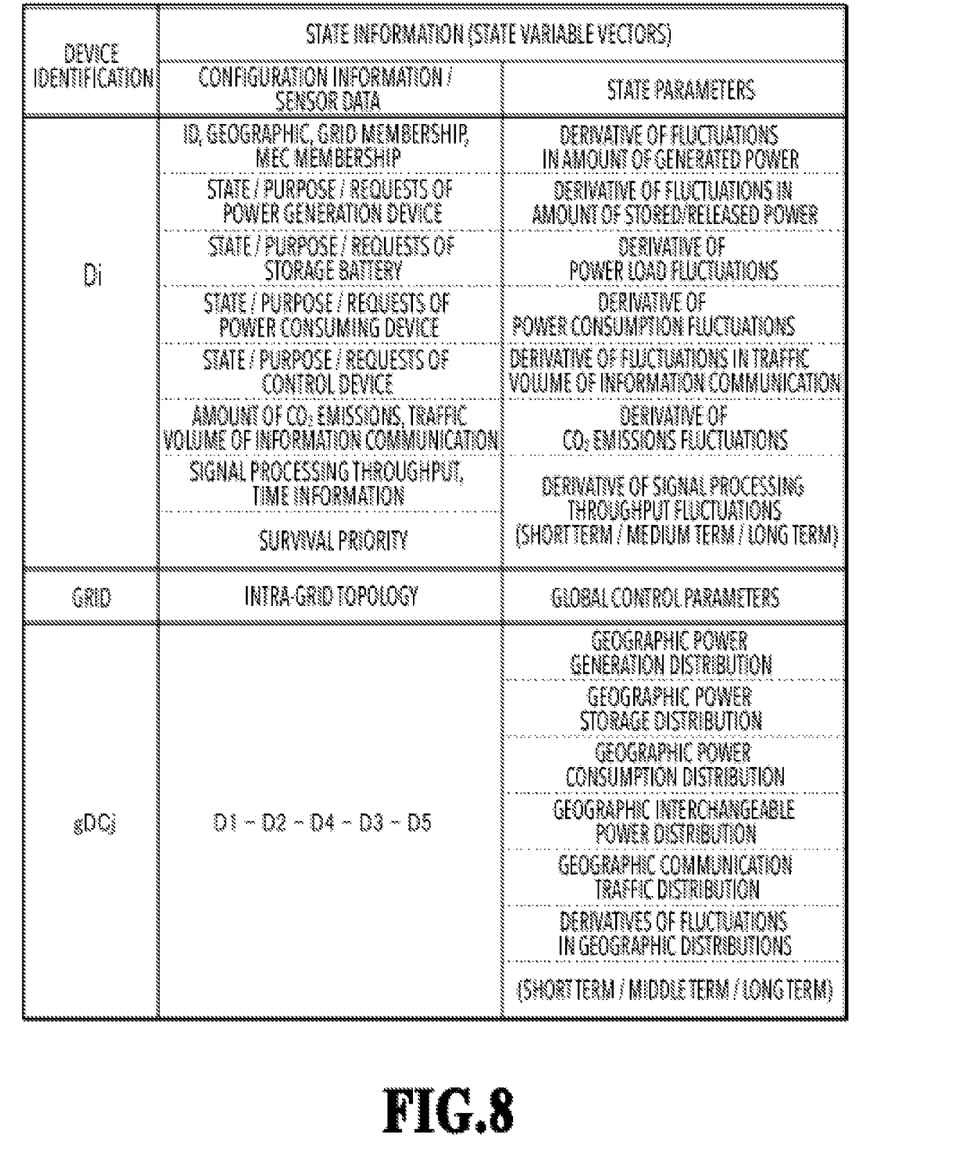
FIG. 8 is a diagram showing an example of state information and global control parameters according to the embodiment.

Each piece of the above state information is expressed as a state variable vector X(t) that depends on time. The supply-reception state monitoring unit 21 collects the state information as shown in FIG. 8, for example. FIG. 8 is a diagram showing an example of the state information and global control parameters according to the embodiment.

A device identification Di represents an i-th device. State variable vectors include preset information (configuration information) on the device Di and sensor data collected by sensors provided in the device Di. For example, the state variable vectors include a device ID, geographic data, grid membership, and MEC membership. The geographic data is location information obtained by, e.g., a GPS in the device. The grid membership is information on the direct-current grid to which the device belongs (membership in terms of the power network). The MEC membership is information on the MEC to which the device belongs (membership in terms of the information and communications network).

If the device is a power generation device, the state variable vectors include information such as the state, purpose, and requests of the power generation device. If the device is a storage battery, the state variable vectors include information such as the state, purpose, and requests of the storage battery. If the device is a power consuming device, the state variable vectors include information such as the state, purpose, and requests of the power consuming device. If the device is a control device, the state variable vectors include information such as the state, purpose, and requests of the control device. The state variable vectors also include the amount of $CO_2$ emissions, the traffic volume of information communication, the signal processing throughput, time information, and the survival priority of the device. The state variable vectors also include, as state parameters, derivatives obtained from the above information. These derivatives include the derivative of fluctuations of the amount of generated power, the derivative of fluctuations of the amount of stored/released power, the derivative of power load fluctuations, the derivative of power consumption fluctuations, and the derivative of fluctuations of the traffic volume of information communication (short term/medium term/long term).

It is to be noted that the state variable vectors may include only part of the above state information and/or may include additional information.

The cloud system 20, in addition to collecting the above state information through the supply-reception state monitoring unit 21, holds information about the intra-grid topology of each direct-current grid, as shown in FIG. 8. The intra-grid topology represents a logical connection relationship or hierarchical relationship among the devices in each direct-current grid. The supply-reception state monitoring unit 21 may collect information about the intra-grid topology from the MEC servers. Based on the state information and the intra-grid topology, the global optimization unit 23 of the cloud system 20 can obtain global control parameters. For example, the global control parameters include the geographic power generation distribution, geographic power storage distribution, geographic power consumption distribution, geographic interchangeable power distribution, geographic communication traffic distribution, and derivatives of fluctuations in these geographic distributions (short term/middle term/long term). The above global control parameters can be obtained by statistically processing the state information on the devices, including the geographic data.

Figure 9:
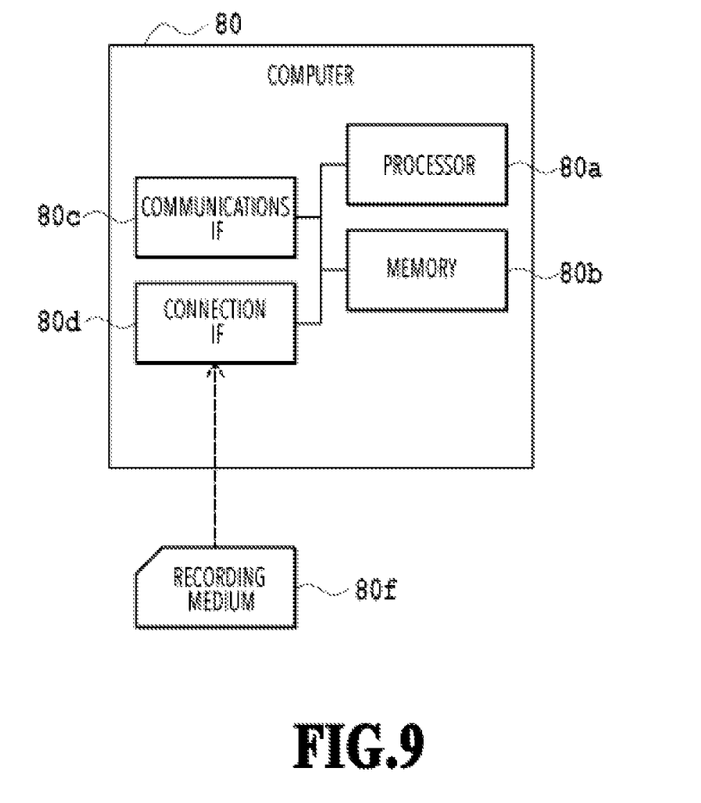
FIG. 9 is a block diagram for describing hardware of a computer capable of implementing functions of a control device for controlling direct-current grids, a control device for controlling power interchange gates, an MEC (Mobile Edge Computing) server, or the cloud system.

Now, hardware of a computer capable of implementing the functions of a control device for controlling the direct-current grids, a control device for controlling the power interchange gates, an MEC server, or the cloud system will be described with reference to FIG. 9. FIG. 9 is a block diagram for describing hardware of a computer capable of implementing the functions of a control device for controlling the direct-current grids, a control device for controlling the power interchange gates, an MEC server, or the cloud system.

The functions of a control device for controlling the direct-current grids, a control device for controlling the power interchange gates, an MEC server, or the cloud system may be implemented by controlling the hardware of a computer 80 illustrated in FIG. 3.

As shown in FIG. 9, the computer 80 may include a processor 80a, a memory 80b, a communications IF 80c, and a connection IF 80d. The processor 80a may be a CPU (Central Processing Unit), a DSP (Digital Signal Processor), an ASIC (Application Specific Integrated Circuit), an FPGA (Field Programmable Gate Array), or a GPU (Graphic Processing Unit). The memory 80b may be a ROM (Read Only Memory), a RAM (Random Access Memory), an HDD (Hard Disk Drive), an SSD (Solid State Drive), or a flash memory.

The communications IF 80c is an interface for connecting to networks such as a wired LAN (Local Area Network), a wireless LAN, an optical communications network, and a mobile communications network. For example, the communications IF 80c may be used to communicate with the MEC server in a wireless base station via a neighboring RRH. If the computer 80 is the MEC server in a wireless base station, the communication IF 80c may be connected to an optical communications network used for communicating with MEC servers in other wireless base stations.

The connection IF 80d is an interface to which external devices are connected. For example, the connection IF 80d may be a USB (Universal Serial Bus) port, an IEEE1394 port, or a SCSI (Small Computer System Interface). A portable recording medium 80f, such as a magnetic recording medium, an optical disc, a magneto-optical disc, or a semiconductor memory, may be connected to the connection IF 80d.

For example, the processor 80a may read a program in the recording medium 80f and store the program in the memory 80b, and control the operations of the computer 80 according to the program read from the memory 80b. The program controlling the operations of the computer 80 may be stored in advance in the memory 80b or may be downloaded from a network via the communications IF 80c.

Thus, the embodiment according to the present disclosure has been described.

As described above, each device, each direct-current grid, and each direct-current grid group perform the autonomous, distributed, and coordinated control. If a failure occurs in some of these elements due to, e.g., a natural disaster, this control enables power supply to be maintained as much as possible and swiftly resumed. If a grid cannot provide all the power needed within the grid, the grid can perform control such as cooperation with the power system and realize stable power supply. If power is still insufficient, some lower-priority devices are powered off based on survival priority. This allows the limited amount of power to be used to maintain power supply to medical facilities and shelters essential for life support. In this manner, application of the above-described embodiment can realize a highly resilient smart city/compact city having a stable power supply mechanism.

Although a preferred embodiment of the present disclosure has been described with reference to the accompanying drawings, the present disclosure is not limited to the examples described. It is apparent that various alterations and modifications within the scope of the claims may occur to those skilled in the art, and such alterations and modifications obviously fall within the technical scope of the present disclosure.

The invention claimed is:

1. A power and communications network convergence system comprising: wireless base stations; and direct-current grid groups, each direct current grid group belonging to a cell formed by a corresponding one of the wireless base stations, wherein each direct-current grid in the direct-current grid group has a direct-current power line to which electric power devices including a power generation device and a power storage device are connected, each wireless base station comprises a server, and a cloud system is configured to be connected to each server establishing a communication network between said wireless base stations, and a server of a wireless base station in each direct-current grid is configured to control, based on state information on each electric power device wirelessly communicated among the electric power devices, said each direct-current grid to perform first control for reducing power fluctuations over time in the direct-current power line, a server of a wireless base station in a first direct-current grid of direct-current grids belonging to a cell is configured to control, based on state information on each direct current grid wirelessly communicated among the direct-current grids, the first direct-current grid to perform second control for interchanging power with a second direct-current grid belonging to the cell, and a server of a wireless base station in a first direct-current grid group belonging to a first cell is configured to control, when a power situation of the first direct-current grid group and a power situation of a second direct-current grid group belonging to a second cell satisfy a first preset condition, the first direct-current grid group to perform third control for interchanging power with the second direct-current grid group.

2. The power and communications network convergence system according to claim 1, wherein at least one direct-current grid in the direct-current grid group is connected to a power system, and a control system comprising the cloud system and a server of a wireless base station in a target direct-current grid is configured to control, when a power situation of the target direct-current grid satisfies a second preset condition while a possible one of the first control and the second control is being performed, the target direct-current grid group to perform fourth control for receiving power supply from the power system.

3. The power and communications network convergence system according to claim 1, wherein a control system comprising the cloud system and a server of a first wireless base station of the wireless base stations is configured to control, when a failure occurs in at least one of functions of the first wireless base station of the wireless base stations, a rest of the functions of the first wireless base station and/or another wireless base station adjacent to the first wireless base station to provide a wireless environment to a direct-current grid group corresponding to the first wireless base station, and the wireless environment is used to wirelessly communicate the state information on each electric power device and/or the state information on each direct-current grid.

4. The power and communications network convergence system according to claim 1, wherein the cell is formed using an antenna group connected to a corresponding wireless base station via optical communications cables extending from the corresponding wireless base station, and the antenna group receives power supplied via dry copper cables extending from a facility in which the corresponding wireless base station resides.

5. The power and communications network convergence system according to claim 1, wherein a third direct-current grid group includes a direct-current grid in which a power feeding and receiving station for charging electric vehicles and receiving power from electric vehicles is connected to the direct-current power line, a control system comprising the cloud system and a server of a wireless base station in the third direct-current grid group is configured to control the third direct-current grid group to perform fifth control for reducing power supply to an electric vehicle being charged at the power feeding and receiving station, and disconnect the power feeding and receiving station from the direct-current power line, when a power situation of the third direct-current grid group satisfies a third preset condition.

6. The power and communications network convergence system according to claim 5, wherein in the fifth control, if an independent power storage device unconnected to the direct-current power line is connected to the power feeding and receiving station, the power feeding and receiving station charges the electric vehicle using power of the independent power storage device after the power feeding and receiving station is disconnected from the direct-current power line.

7. The power and communications network convergence system according to claim 2, wherein said control system is further configured to set survival priority for each of power consuming devices that consume power among the electric power devices, the power consuming devices are connected to the target direct-current grid, and when a power situation satisfies a preset fourth condition while a possible one of the first to fourth control is being performed, said control system controls the direct-current grid group to perform sixth control for powering off the power consuming devices in ascending order of survival priority.

* * * * *

UNITED STATES PATENT AND TRADEMARK OFFICE
CERTIFICATE OF CORRECTION

| | | |
|---|---|---|
| PATENT NO. | : 11,848,556 B2 | Page 1 of 1 |
| APPLICATION NO. | : 17/264615 | |
| DATED | : December 19, 2023 | |
| INVENTOR(S) | : Taiichi Otsuji et al. | |

It is certified that error appears in the above-identified patent and that said Letters Patent is hereby corrected as shown below:

On the Title Page

After item (73) Assignee, change "SUMITOMO MITSUI BANKING CORPORATION" to --TOHOKU UNIVERSITY--

Signed and Sealed this
Twenty-fourth Day of September, 2024

Katherine Kelly Vidal
*Director of the United States Patent and Trademark Office*